No. 734,234. Patented July 21, 1903.

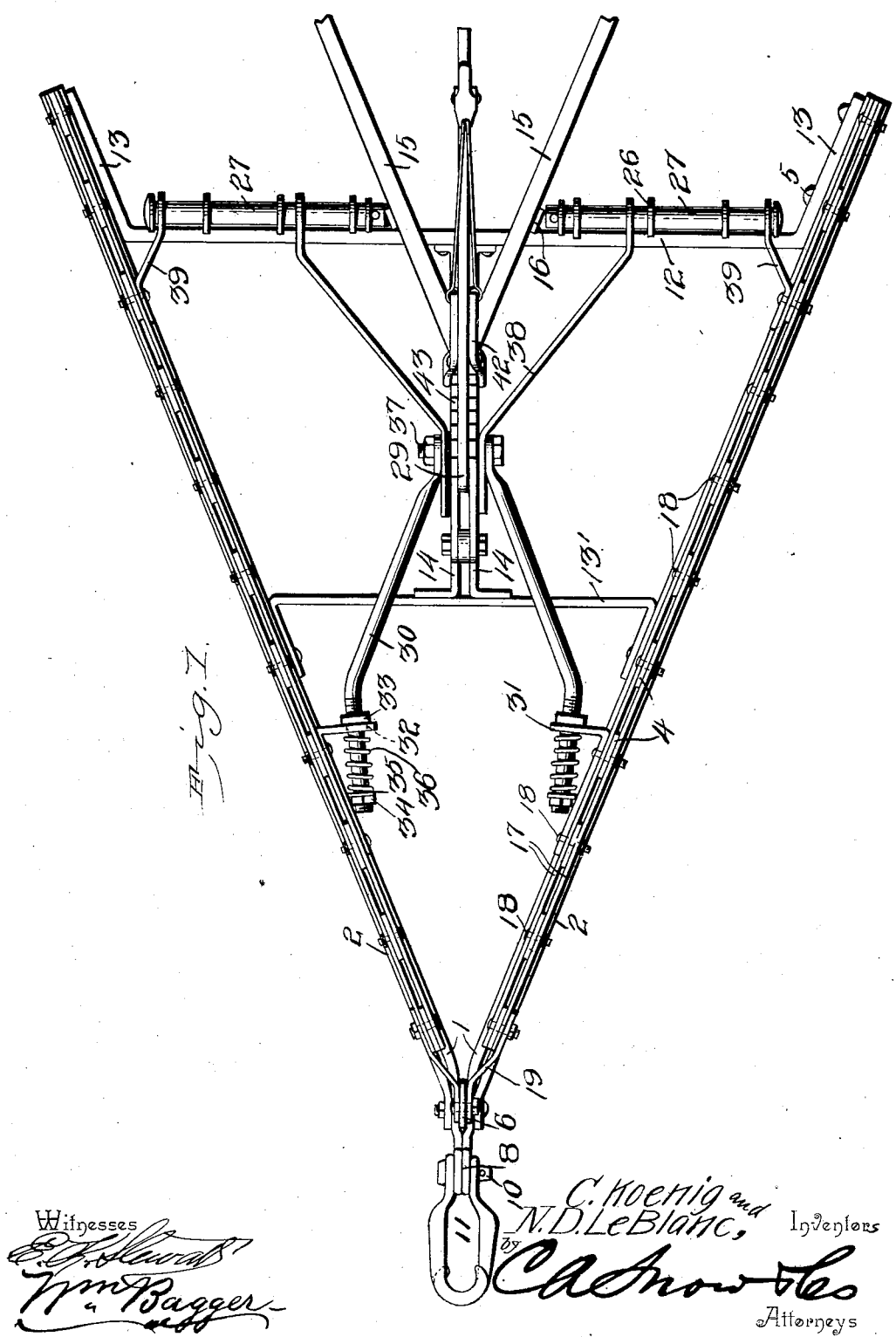

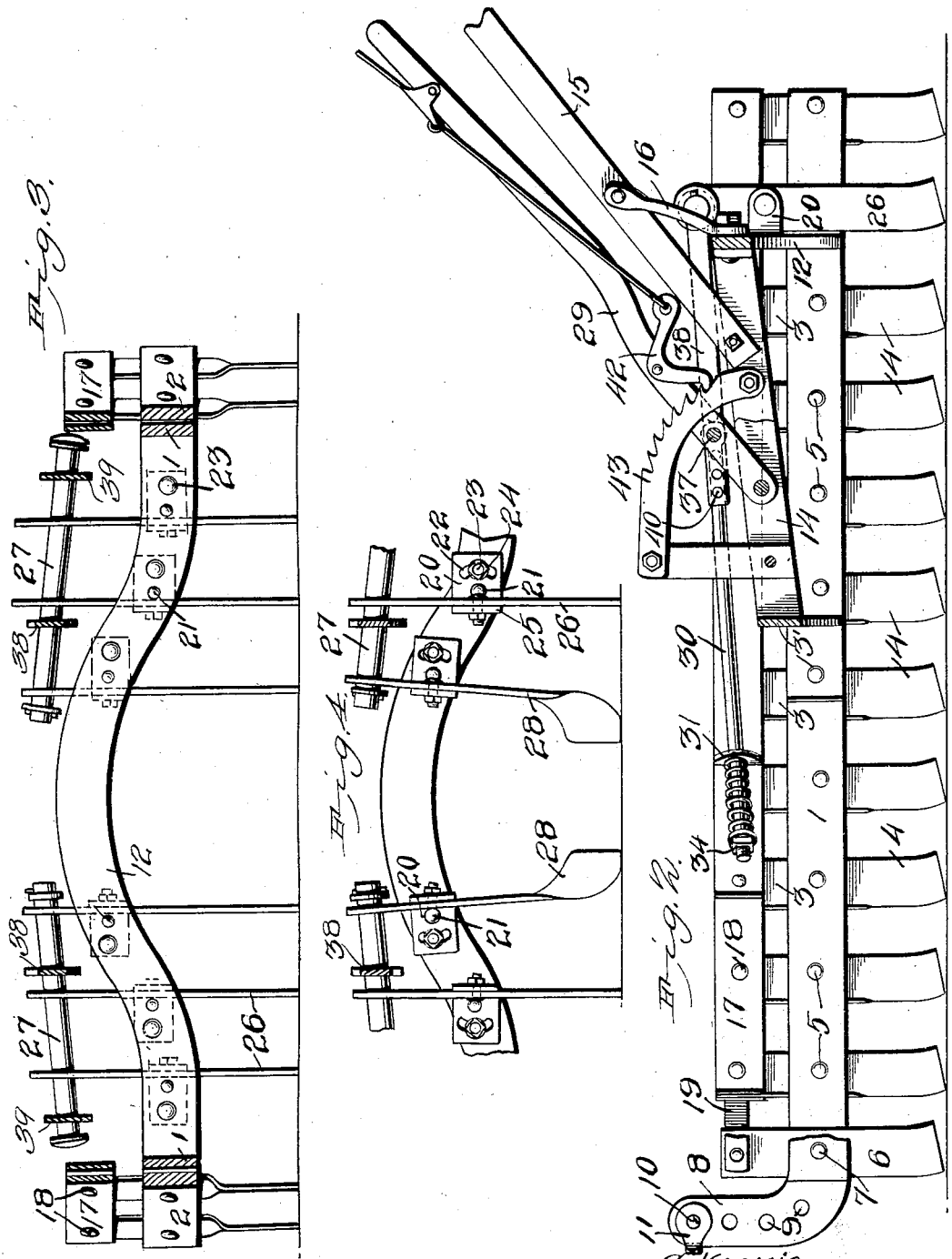

UNITED STATES PATENT OFFICE.

CLEMENT KOENIG AND NUMA D. LE BLANC, OF ERATH, LOUISIANA.

COMBINED HARROW AND CULTIVATOR.

SPECIFICATION forming part of Letters Patent No. 734,234, dated July 21, 1903.

Application filed March 14, 1903. Serial No. 147,837. (No model.)

*To all whom it may concern:*

Be it known that we, CLEMENT KOENIG and NUMA D. LE BLANC, citizens of the United States, residing at Erath, in the parish of Vermilion and State of Louisiana, have invented a new and useful Combined Harrow and Cultivator, of which the following is a specification.

This invention relates to farm implements of that class which may be used interchangeably as a harrow or as a cultivator; and it has for its object to produce a machine of this class in which simplicity of construction and durability shall be combined with efficiency as regards the operation of the device and facility in adapting it to the various purposes for which it has been designed.

With these ends in view the invention consists in the improved construction, arrangement, and combination of parts which will be hereinafter fully described, and particularly pointed out in the claims.

In the accompanying drawings, Figure 1 is a top plan view of a harrow constructed in accordance with our invention. Fig. 2 is a longitudinal sectional view of the same. Fig. 3 is a vertical transverse sectional view taken in front of the rear cross-bar and looking rearward. Fig. 4 is a detail view in elevation, showing cultivator-blades substituted for some of the teeth at the rear end of the frame.

Corresponding parts in the several figures are indicated by like characters of reference.

The frame of our improved implement is triangular in shape and is composed mainly of the inner frame-bars 1 1 and the outer frame-bars 2 2, which are spaced by the shanks 3 of the blades 4, which are interposed between the said inner and outer frame-bars and are mounted pivotally upon bolts 5 or other connecting means, which serve the double purpose of connecting the inner with the outer frame-bars and of forming pivots upon which the blades may have a swinging or tilting movement. The blades, it will thus be seen, are arranged in two sets or series, one at each side of the frame. An additional blade 6 is interposed between the inner side bars or frame-bars 1 1 at the converging front ends of the latter and is mounted pivotally upon the bolt 7, which connects the said inner frame-bars with each other and with the front ends of the outer frame-bars 2 2. In front of this junction or connecting-point the front ends of the inner frame-bars 1 1 are curved upwardly to form a bracket 8, which is provided with perforations 9, any one of which is adapted to receive a bolt 10, carrying a clevis or lap ring 11 for the attachment of the draft, which may thus be raised or lowered to any desired point to suit the conditions of the work to be performed.

The rear ends of the frame-bars are spaced and connected by means of the rear connecting-bar 12, the ends of which are bent to form brackets 13, which are connected directly with the inner frame-bars 1 by means of the bolts 5, which form the points of pivotal attachment for the blades at the rear end of the frame. Other means of attachment for the spacing-bar 12 might obviously be used; but the means described are simple and efficient. The spacing-bar 12 may be arched, as clearly shown in Figs. 3 and 4 of the drawings; but this is not always necessary.

An intermediate transversely-arranged spacing-bar 13' connects the sides of the frame at a point intermediate between the point of the frame and the rear spacing-bar 12. The bars 12 and 13' are connected by means of longitudinal bars 14, which serve as points of attachment of the handles 15, which latter are also connected with the rear bar 12 by means of links or braces 16. The longitudinal frame-bars 14 also serve to support the adjusting mechanism which will be hereinafter described.

The upper ends of the shanks 3 of the knives or blades are connected by means of longitudinal connecting-bars 17, which may be arranged on either or both sides of said shanks and which have pivotal connection therewith by means of bolts or rivets 18, bolts being preferred, at least as regards the connection with the blades at the front end of the frame, which, under conditions which will hereinafter be described, occasionally require to be detached. Any other means of pivotal connection which will admit of separation of the parts may be substituted. The front ends of the connecting-bars 17 are connected, by means of links 19, with the upper end of the blade 6, arranged at the point of the triangular frame. It will be observed that by moving the connecting-bars the teeth or blades on each side of the frame will be moved in unison to any desired tilting position.

Upon the rear side of the rear frame-bar 12 are mounted a series of L-shaped plates 20, the said plates being secured pivotally by means of bolts or rivets 21. The parts of the plates 20 adjacent to the frame-bar 12 are provided with slots 22 for the reception of bolts 23, extending through said frame-bar and having adjusting-nuts 24 thereon. By this means of attachment the said L-shaped plates may be adjusted in such a manner as to place their rearwardly-extending arms 25 at various angles with relation to the frame-bar 12. Secured pivotally to the rearwardly-extending arms 25 are blades 26, the upper ends of which have pivotal connection with horizontally-arranged rods 27. The blades 26 may be of any desired construction. They may have straight cutting edges, like the blades 4, at the sides of the frame, or when the device is to be used for cultivating growing crops cultivator-shovels, as 28, may be substituted, as shown in Fig. 4 of the drawings.

29 designates a lever which is mounted pivotally between the longitudinal connecting-bars 14, which serve to connect the rear and intermediate frame-bars 12 and 13'. The said lever is connected, by means of links 30, with brackets 31 upon the inner sides of the connecting-bars 17, which serve to connect the upper ends of the shanks 3 of the blades pivoted at the sides of the frame. The brackets 31 have perforations 32 for the passage of the front ends of the links 30, which said links move slidingly in said perforations, their movement in a forward direction being limited by means of nuts 33, adjusted upon said links in rear of the brackets 31. The front ends of the links or, more properly, link-rods 30 are provided with nuts 34 and washers 35, between which and the front sides of the brackets 31 are arranged springs 36, coiled upon the said link-rods and serving to force the latter in a forward direction, the movement being limited, as before described, by means of the adjusting-nuts 33.

The same bolt 37 which connects the lever 29 with the link-rods 30 also serves to connect the said lever with the forward ends of links 38, the rear ends of which have perforations engaging the rods 27 and having pivotal connection therewith. The opposite ends of said rods are mounted in brackets 39, which are secured to the inner sides of the connecting-bars 17, already described. The forward ends of the links 38 are provided with several perforations 40 for the reception of the connecting-bolt 37, with relation to which the said links 38 are consequently adjusted. It will be seen that by moving the adjusting-links 38 in a rearward direction the inner ends of the supporting-rods 27 will be moved in a rearward direction, thereby adjusting and regulating the tilt or pitch of the blades, with the upper ends of which the said supporting-rods have pivotal connection.

The lever 29 is provided with a suitably-operated pawl or catch 42, engaging the teeth of a segment-rack 43, which is suitably supported by the frame-bars 14. By this means the parts controlled by said lever may be retained at any desired point of adjustment.

The operation of the invention as a harrow will be readily understood. The teeth or blades are all placed in the frame, the straight blades (shown in Fig. 3) being used at the rear end of the frame. By operating or manipulating the lever 29 the pitch or tilt of all of the teeth may be simultaneously regulated or adjusted, owing to the connection of said lever through the link-rods 30 with the sides of the frame and through the links 38 with the supporting-rods 27 at the rear end of the frame. Should any obstructions in the ground be encountered by any of the teeth, there will be no danger of any of the parts of the frame breaking, because the jolt will be communicated through the connecting-bars 17 and brackets 31 to the springs 36, which will simply be compressed, while injury to the machine is avoided.

In order to convert the device into a cultivator for operating upon growing crops, it is only necessary to detach the front blade 6 and one or two blades at the front end of each side of the frame, thus making an opening of sufficient width to straddle the row of the plants. At the rear end of the frame the shovels 28 are substituted for blades 26, and the implement is then ready for operation. When used in this manner, it will be found very convenient to be able to adjust the tilt or pitch of the cultivator-shovels by the adjustment of the links 38, which connect the inner ends of the supporting-rods 27, with the adjusting-lever.

It should be stated that the blades 4 at the sides of the frame, as well as the remaining blades of the device, may be of any desired construction. We prefer, however, to twist the said blades at an angle to the shanks thereof, so as to present the cutting edge in the line of draft of the machine.

Having thus described our invention, we claim and desire to secure by Letters Patent of the United States—

1. In an implement of the class described, the triangular frame comprising inner frame-bars converging at and having upwardly-extending front ends pierced for the attachment of the draft, and outer frame-bars terminating at the converging-point of the inner frame-bars, in combination with blades interposed between said inner and outer frame-bars, a front blade interposed between the converging ends of the inner frame-bars, and connecting means upon which the said blades have pivotal action, substantially as set forth.

2. In an implement of the class described, the triangular frame comprising inner frame-bars converging at and having upwardly-extending front ends pierced for the attachment of the draft, and outer frame-bars terminating at the converging-point of the inner frame-bars, in combination with blades interposed between said inner and outer frame-bars, a front blade interposed between the converging ends of the inner frame-bars, connecting means upon which the said blades have pivotal action, longitudinal bars having pivotal connection with the upper ends of the blades interposed between the inner and outer side bars, links connecting the front ends of said connecting-bars with the upper end of the blade interposed at the converging-point between the inner frame-bars, and adjusting mechanism whereby the said blades may be tilted into and retained at various points of adjustment, substantially as set forth.

3. In an implement of the class described, the combination of the triangular frame comprising the side bars, a rear spacing-bar and an intermediate spacing-bar, the blades having pivotal connection with the side bars of the frame, the longitudinal connecting-bars having pivotal connection with the upper ends of the blades, longitudinal braces connecting the intermediate and rear spacing-bars, an adjusting-lever having pivotal connection with said braces, link-rods extending from said lever through brackets upon the bars connecting the upper ends of the blades, and springs interposed between said brackets and the front ends of the link-rods, substantially as set forth.

4. In an implement of the class described, the combination of the triangular frame having teeth pivotally mounted therein, the rear and intermediate spacing-bars, longitudinal braces connecting said rear and intermediate spacing-bars, plates mounted pivotally and adjustably upon the rear spacing-bars and having rearward-extending arms, blades mounted pivotally upon said arms, rods having pivotal connection with the upper ends of said blades, brackets attached to longitudinal bars having pivotal connection with the upper ends of the teeth mounted in the triangular frame, said brackets supporting the outer ends of the rods having pivotal connection with the rear blades, an adjusting-lever, and links connecting adjustably with said adjusting-lever and having pivotal connection with the inner ends of the rods connecting the upper ends of the rear blades, substantially as set forth.

5. In an implement of the class described, the combination of the triangular frame having teeth pivotally mounted therein, the rear and intermediate spacing-bars, plates mounted pivotally and adjustably upon the rear spacing-bars and having rearward-extending arms, blades mounted pivotally upon said arms, transversely-arranged rods having pivotal connection with the upper ends of said blades, longitudinal connecting-rods having pivotal connection with the upper ends of the teeth mounted in the triangular frame, brackets upon said connecting-rods supporting the outer ends of the transverse connecting-rods to the rear blades, a lever pivoted to longitudinal braces connecting the rear and intermediate spacing-bars, link-rods connecting said lever with brackets upon the inner sides of the longitudinal bars connecting the teeth in the triangular frame and having a sliding movement in said brackets, springs coiled upon said rods in front of said brackets and bearing against nuts upon the link-rods to force the latter in a forward direction, link-rods having adjustable connection at their front ends with the adjusting-lever and having pivotal connection at their rear ends with the inner ends of the transverse rods connecting the rear blades, and means for retaining the lever at the desired adjustment, substantially as set forth.

In testimony that we claim the foregoing as our own we have hereto affixed our signatures in the presence of two witnesses.

CLEMENT KOENIG.
NUMA D. LE BLANC.

Witnesses:
ALFRED DELCAMBER,
THEODORE TRAHAN.